US012596737B2

(12) United States Patent
Huang et al.

(10) Patent No.: US 12,596,737 B2
(45) Date of Patent: Apr. 7, 2026

(54) METHOD FOR GENERATING USER INTEREST PROFILE, ELECTRONIC DEVICE AND STORAGE MEDIUM

(71) Applicant: BAIDU INTERNATIONAL TECHNOLOGY (SHENZHEN) CO., LTD., Shenzhen (CN)

(72) Inventors: Chao Huang, Shenzhen (CN); Guangjun Wang, Shenzhen (CN); Guolin Cao, Shenzhen (CN); Xiaolong Lin, Shenzhen (CN); Gang Qiao, Shenzhen (CN); Zhenpeng Zhan, Shenzhen (CN)

(73) Assignee: BAIDU INTERNATIONAL TECHNOLOGY (SHENZHEN) CO., LTD., Shenzhen (CN)

( * ) Notice: Subject to any disclaimer, the term of this patent is extended or adjusted under 35 U.S.C. 154(b) by 210 days.

(21) Appl. No.: 17/694,422

(22) Filed: Mar. 14, 2022

(65) Prior Publication Data

US 2022/0198358 A1 Jun. 23, 2022

(30) Foreign Application Priority Data

Apr. 27, 2021 (CN) ......................... 202110460557.3

(51) Int. Cl.
*G06F 16/335* (2019.01)
*G06F 16/3332* (2025.01)
*G06N 5/02* (2023.01)

(52) U.S. Cl.
CPC ........ *G06F 16/337* (2019.01); *G06F 16/3334* (2019.01); *G06N 5/02* (2013.01)

(58) Field of Classification Search
CPC ...... G06F 16/337; G06F 16/3334; G06N 5/02
See application file for complete search history.

(56) References Cited

U.S. PATENT DOCUMENTS

| | | | |
|---|---|---|---|
| 10,943,072 B1 * | 3/2021 | Jaganmohan | .......... G06N 5/041 |
| 2014/0040297 A1 * | 2/2014 | Ozonat | ................. G06F 16/313 |
| | | | 707/E17.014 |

(Continued)

FOREIGN PATENT DOCUMENTS

| | | |
|---|---|---|
| CN | 108694223 A | 10/2018 |
| CN | 110019837 A | 7/2019 |

(Continued)

OTHER PUBLICATIONS

Extended European Search Report for Application No. 22162384.6, dated Jul. 21, 2022, 8 pages.

(Continued)

*Primary Examiner* — Jensen Hu
(74) *Attorney, Agent, or Firm* — Lippes Mathias LLP

(57) ABSTRACT

A method for generating a user interest profile includes: generating at least one keyword by extracting information from input information of a user; generating interest tags corresponding to the at least one keyword by matching the at least one keyword with tags corresponding to nodes of a knowledge graph; sorting the interest tags corresponding to the at least one keyword; and generating a user interest profile based on the sorted interest tags corresponding to the at least one keyword.

6 Claims, 4 Drawing Sheets

(56)        References Cited

U.S. PATENT DOCUMENTS

| | | | | |
|---|---|---|---|---|
| 2015/0310073 | A1* | 10/2015 | Chakrabarti | G06F 16/2465 |
| | | | | 707/722 |
| 2015/0324889 | A1* | 11/2015 | Kanigsberg | G06Q 30/02 |
| | | | | 705/26.62 |
| 2017/0076206 | A1* | 3/2017 | Lastras-Montano | |
| | | | | G06F 16/3344 |
| 2017/0221007 | A1 | 8/2017 | Tang et al. | |
| 2017/0293690 | A1* | 10/2017 | Malhotra | G06F 16/9535 |
| 2017/0364580 | A1* | 12/2017 | Ishitobi | G06F 21/6254 |
| 2019/0073420 | A1* | 3/2019 | Agapiev | G06N 3/08 |
| 2019/0384828 | A1* | 12/2019 | Bangalore Narayanamurthy | G06F 16/2453 |
| 2020/0320086 | A1* | 10/2020 | Liu | G06F 16/367 |
| 2021/0117617 | A1* | 4/2021 | Blaya | G06F 40/253 |

FOREIGN PATENT DOCUMENTS

| | | | |
|---|---|---|---|
| CN | 112232889 | A | 1/2021 |
| JP | 2008077512 | A | 4/2008 |
| JP | 2016045552 | A | 4/2016 |
| WO | 2018103622 | A1 | 6/2018 |

OTHER PUBLICATIONS

Office Action for Japanese Application No. 2022-054740, dated Apr. 25, 2023, 10 pages.
Office Action for Chinese Application No. 202110460557.3, dated Jun. 9, 2023, 17 pages.
Wu, Shi-qing et al.; "Research on the Researcher Profiling Construction Strategy of University Libraries in the Big Data Situation"; Journal of Jiangsu University of Technology; vol. 25, No. 6; Dec. 15, 2019; 5 pages; Abstract.
Ju, Xinghai et al.; "Research on User Portrait Construction Technology"; Journal of Information Engineering Universtiy; vol. 21, No. 2; Apr. 15, 2020; 9 pages; Abstract.

* cited by examiner

METHOD FOR GENERATING USER INTEREST PROFILE, ELECTRONIC DEVICE AND STORAGE MEDIUM

CROSS-REFERENCE TO RELATED APPLICATION

This application claims priority to Chinese Patent Application No. 202110460557.3, filed on Apr. 27, 2021, the entire content of which is incorporated herein by reference.

TECHNICAL FIELD

The disclosure relates to the field of computer technologies, specially to the field of artificial intelligence (AI) technologies such as natural language processing and knowledge graph, and in particular to a method for generating a user interest profile, an electronic device and a storage medium.

BACKGROUND

A user interest profile is a set of user interest tags, which can reflect content that a user is interested in. User behaviors have brought a series of changes and remodeling to products and services of enterprises as the Internet entered the era of big data. User profiles, as the foundation for enterprises to apply big data, are the basis for page presentation, data drainage, advertisement display and content recommendation in the Internet field. It has become a focus of many enterprises to accurately determine the user interest profile.

SUMMARY

According to a first aspect of the disclosure, a method for generating a user interest profile is provided. The method includes: generating at least one keyword by extracting information from input information of a user; generating interest tags corresponding to the at least one keyword by matching the at least one keyword with tags corresponding to nodes of a knowledge graph; sorting the interest tags corresponding to the at least one keyword; and generating a user interest profile based on the sorted interest tags corresponding to the at least one keyword.

According to a second aspect of the disclosure, an electronic device is provided. The electronic device includes at least one processor and a memory communicatively coupled to the at least one processor. The memory is configured to store instructions executable by the at least one processor, and when the instructions are executed by the at least one processor, the at least one processor is caused to execute the above method for generating the user interest profile.

According to a third aspect of the disclosure, a non-transitory computer-readable storage medium having computer instructions stored thereon is provided. The computer instructions are configured to cause a computer to execute the above method for generating the user interest profile.

It should be understood that the content described in this section is not intended to identify key or important features of embodiments of the disclosure, nor is it intended to limit the scope of the disclosure. Additional features of the disclosure will be easily understood based on the following description.

BRIEF DESCRIPTION OF THE DRAWINGS

The drawings are used to better understand solutions and do not constitute a limitation to the disclosure, in which.

DETAILED DESCRIPTION

The following describes embodiments of the disclosure with reference to the drawings, which includes various details of embodiments of the disclosure to facilitate understanding and shall be considered merely exemplary. Therefore, those of ordinary skill in the art should recognize that various changes and modifications can be made to embodiments described herein without departing from the scope and spirit of the disclosure. For clarity and conciseness, descriptions of well-known functions and structures are omitted in the following description.

It should be noted that, in technical solutions of the disclosure, acquisition, storage and application of user's personal information involved all comply with provisions of relevant laws and regulations and do not violate public order and customs.

The disclosure provides a method for generating a user interest profile. According to the method for generating the user interest profile, information is extracted from input information of a user to generate at least one keyword. The at least one keyword is matched with tags corresponding to nodes of a knowledge graph to generate interest tags corresponding to the at least one keyword. The interest tags corresponding to the at least one keyword are sorted. The user interest profile is generated based on the sorted interest tags corresponding to the at least one keyword. Since the interest tags are derived from the tags corresponding to the nodes of the knowledge graph, there is no need to manually tag data or manually formulate rules to obtain the tags, and the entire user profile construction process does not need manual intervention, thereby reducing the labor cost for generating the user interest profile.

The following describes a method for generating a user interest profile, an apparatus for generating a user interest profile, an electronic device, a non-transitory computer-readable storage medium and a computer program product according to embodiments of the disclosure, with reference to the drawings.

Figure 1:
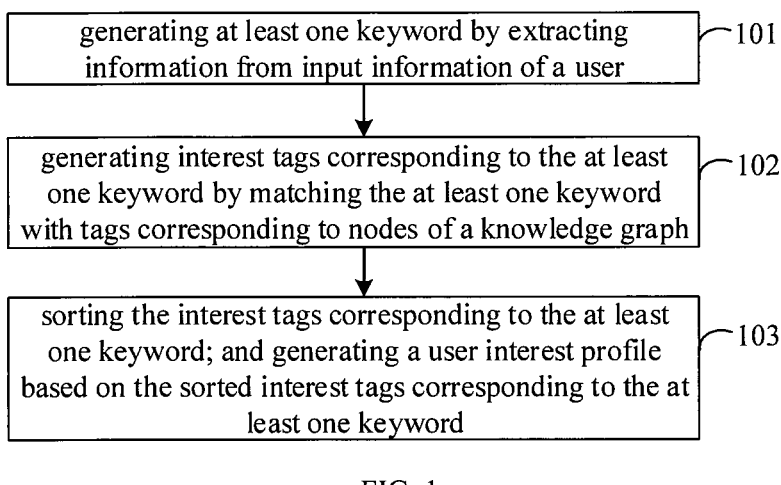
FIG. 1 is a flowchart of a method for generating a user interest profile according to a first embodiment of the disclosure.

With reference to FIG. 1, the method for generating the user interest profile according to the disclosure will be described in detail.

FIG. 1 is a flowchart of a method for generating a user interest profile according to a first embodiment of the disclosure. It should be noted that, in the method for generating the user interest profile in some embodiments, an execution subject is an apparatus for generating a user interest profile, hereinafter referred to as the generating device. The generating device may be an electronic device or may be configured in an electronic device, to reduce the labor cost when generating the user interest profile. Some embodiments of the disclosure are described by taking the generating device configured in the electronic device as an example.

Electronic devices can be any stationary or mobile computing devices capable of data processing, for example mobile computing devices such as notebook computers, smart phones or wearable devices, or stationary computing devices such as desktop computers, servers or other types of computing devices, which are not limited in the disclosure.

As shown in FIG. 1, the method for generating the user interest profile includes the following.

In 101, at least one keyword is generated by extracting information from input information of a user.

The input information of the user can be any information input by the user through a human-computer interaction interface of the electronic device where the generating device is located, or any information input by the user through a human-computer interaction interface of other electronic device, or any information obtained by the generating device from other electronic device, or any information obtained by the generating device in other ways, which is not limited in the disclosure.

In addition, the input information of the user may be input information in Chinese, Japanese or other languages, and the disclosure does not limit the language of the input information.

In some embodiments, the generating device may extract the information from the input information in the following manner to generate the at least one keyword.

Firstly, the generating device can carry out word segmentation process on the input information of the user, to obtain at least a word unit. When a word unit is obtained after the word segmentation process, the word unit is determined as a keyword after extracting information.

When there are a plurality of word units obtained after the word segmentation process, for each word unit, a weight can be set for the word unit, and the weight of the word unit is increased or decreased based on part-of-speech of the word unit, such that the processed word units are obtained. In detail, the word unit in the plurality of word units can be tagged with the part-of-speech, for example, the word unit can be tagged as general noun, proper noun, auxiliary word or verb, and the weight of the word unit is increased or decreased based on the part-of-speech and a prior knowledge. For example, the weight of the proper noun may be increased and the weight of the modal particle may be decreased, so as to obtain the processed word units.

After the weight of each word unit is increased or decreased based on the corresponding part-of-speech, named entity recognition can be performed on each word unit. According to the recognition result, the weight of each word unit is further increased or decreased. For example, when a word unit is an entity word such as personal name, place name, organization name, drug or time, the weight of the word unit is increased, and the weights of the remaining word units are decreased, to obtain the processed word units after the whole process.

Further, an importance of each word unit can be determined according to the manually formulated rules, so that the weight of each word unit is further increased or decreased according to the importance of each word unit, to obtain the processed word units after the process. The manually formulated rules are rules and methods for calculating the importance of each word unit based on statistical analysis and prior experience.

Further, attribute extraction and relationship extraction in the knowledge graph are combined to increase the accuracy of the attribute feature of each word unit, so that the weight of each word unit is increased or decreased according to the accuracy of the attribute feature of each word unit. Therefore, word units whose weights exceed a preset weight threshold may be determined as keywords generated after information extraction.

It should be noted that the above-mentioned mode of extracting the information from the input information of the user is only an example. In practical applications, those of ordinary skill in the art can use any information extraction method in the natural language processing technology to extract the information from the input information of the user, to generate the at least one keyword, which is not limited in the disclosure.

In 102, interest tags are generated corresponding to the at least one keyword by matching the at least one keyword with tags corresponding to nodes of a knowledge graph.

The knowledge graph can be constructed based on the encyclopedia knowledge base using information extraction technology and knowledge fusion technology. The interest tags corresponding to the at least one keyword are all interest tags corresponding to all the keywords.

It is understood that each node of the nodes of the knowledge graph corresponds to a tag, and in some embodiments of the disclosure, at least one keyword can be matched with the tags corresponding to the nodes of the knowledge graph, to generate the interest tags corresponding to the at least one keyword.

It should be noted that, by matching a keyword with the tags corresponding to the nodes of the knowledge graph, one interest tag or a plurality of interest tags corresponding to the keyword may be obtained, or there may not be any interest tag corresponding to the keyword. In addition, the interest tags corresponding to different keywords may also be the same. In some embodiments of the disclosure, the interest tags corresponding to the at least one keyword may be one or more, which is not limited in the disclosure.

For example, it is supposed that the information is extracted from the input information of the user, and two keywords "AA" and "BB" are generated, where "AA" is a name of an actor, and "BB" is a name of a cartoon. "AA" is matched with the tags corresponding to the nodes of the knowledge graph, and two interest tags "AA" and "actor" corresponding to "AA" are obtained. "BB" is matched with the tags corresponding to the nodes of the knowledge graph, and three interest tags "BB", "inspiring anime" and "Anime" corresponding to "BB" are obtained. Then a total of five interest tags corresponding to "AA" and "BB" are generated, i.e., "AA", "actor", "BB", "inspiring anime" and "Anime".

In 103, the interest tags corresponding to the at least one keyword are sorted, and a user interest profile is generated based on the sorted interest tags corresponding to the at least one keyword.

In some embodiments of the disclosure, after generating the interest tags corresponding to the at least one keyword, these interest tags can be sorted, and then the user interest profile is generated based on the sorted interest tags.

The method for sorting the interest tags corresponding to the at least one keyword can be set as required. For example, the interest tags corresponding to the at least one keyword can be sorted based on a number of page views of each interest tag. Alternatively, a sorting model can be obtained by pre-training, each interest tag can be scored by using the sorting model, and the interest tags corresponding to the at least one keyword are sorted based on the score corresponding to each interest tag. Alternatively, the interest tags corresponding to the at least one keyword can also be sorted in other ways, which is not limited in the disclosure.

For example, it is supposed that the information is extracted from the input information of the user, two keywords "AA" and "BB" are generated, and five interest tags corresponding to "AA" and "BB" are generated, i.e., "AA", "actor", "BB", "inspiring anime" and "Anime". Suppose the number of page views corresponding to "AA" in XX Encyclopedia is 10,000, the number of page views corresponding to "BB" is 20,000, the number of page views corresponding to "actor" is 500, and the number of page views corresponding to "inspiring anime" is 600, and the number of page views corresponding to "Anime" is 400, then the sorted interest tags can be obtained as "AA", "actor", "BB", "inspiring anime" and "Anime", so that according to the sorted five interest tags, the user interest profile is generated.

It should be noted that, when the number of interest tags corresponding to the at least one keyword is one, the user interest profile can be directly generated based on the one interest tag.

In the method for generating the user interest profile according to some embodiments of the disclosure, the information is extracted from the input information of the user to generate the at least one keyword. The at least one keyword is matched with the tags corresponding to the nodes of the knowledge graph to generate the interest tags corresponding to the at least one keyword. The interest tags corresponding to the at least one keyword are sorted, and the user interest profile is generated based on the sorted interest tags corresponding to the at least one keyword. Since the interest tags are derived from the tags corresponding to the nodes of the knowledge graph, there is no need to manually tag a large amount of data to train a machine learning mining model to generate the interest tags, or no need to invest a lot of human resources to analyze user behavior data and formulate rules from user behaviors to the interest tags to obtain the interest tags, such that the entire user profile construction process does not need manual intervention, thereby reducing the labor cost required for generating the user interest profile. In addition, since the knowledge graph is constructed based on the encyclopedia knowledge base, the tags corresponding to the nodes in the knowledge graph can be updated as the update of the encyclopedic knowledge base, so that high-confidence interest tags can be obtained to generate the user interest profile, to improve the accuracy of the user interest profile. In some embodiments of the disclosure, regardless of the language type of the user input information, the user interest profile can be quickly generated, and the generalization is good.

According to the method for generating the user interest profile of some embodiments of the disclosure, the information is extracted from the input information of the user to generate the at least one keyword. The at least one keyword is matched with the tags corresponding to the nodes of the knowledge graph to generate the interest tags corresponding to the at least one keyword. The interest tags corresponding to the at least one keyword are sorted, and the user interest profile is generated based on the sorted interest tags corresponding to the at least one keyword. Therefore, the labor cost for generating the user interest profile is reduced.

6

Figure 2:
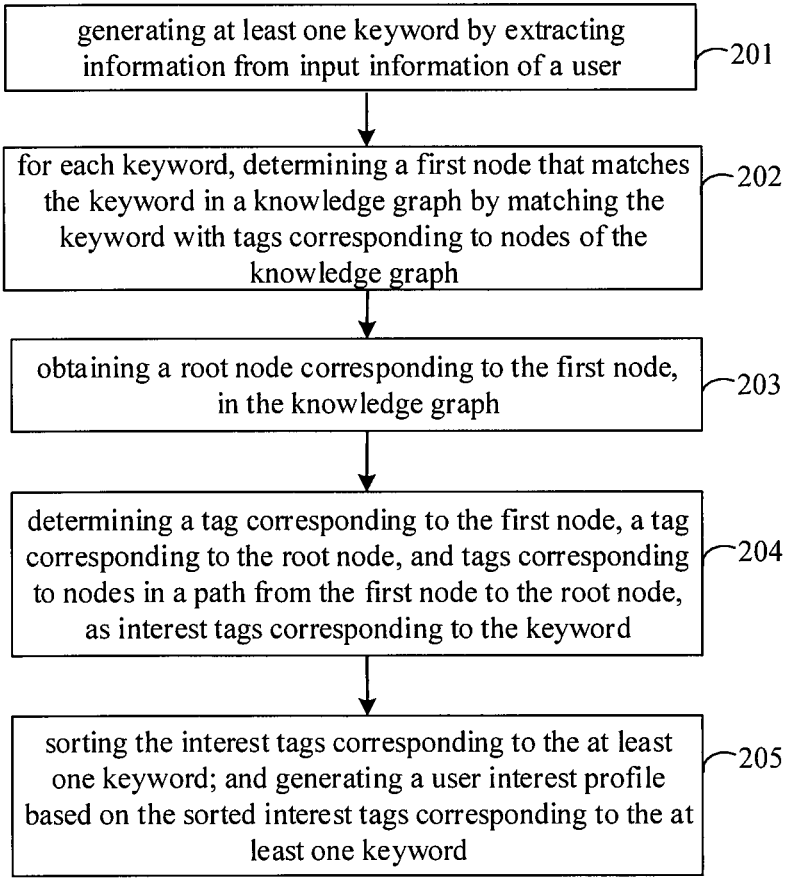
FIG. 2 is a flowchart of a method for generating a user interest profile according to a second embodiment of the disclosure.

According to the above analysis, in some embodiments of the disclosure, the at least one keyword can be matched with the tags corresponding to the nodes of the knowledge graph to generate the interest tags corresponding to the at least one keyword. With reference to FIG. 2, in the method for generating the user interest profile of the disclosure, the process of generating the interest tags corresponding to the at least one keyword by matching the at least one keyword with the tags corresponding to the nodes of the knowledge graph is further described.

FIG. 2 is a flowchart of a method for generating a user interest profile according to a second embodiment of the disclosure. As shown in FIG. 2, the method for generating the user interest profile may include the following.

In 201, at least one keyword is generated by extracting information from input information of a user.

For the specific implementation process and principle of the foregoing 201, reference may be made to the description of the foregoing embodiments, which will not be repeated herein.

In 202, for each keyword, a first node that matches the keyword in the knowledge graph is determined by matching the keyword with the tags corresponding to the nodes of the knowledge graph.

In some embodiments, the information is extracted from the input information of the user. When there is one keyword, the generated keyword can be matched with the tags corresponding to the nodes of the knowledge graph to determine the interest tags corresponding to the keyword in the knowledge graph. When there are a plurality of keywords generated, each generated keyword is matched with the tags corresponding to the nodes of the knowledge graph to determine the interest tags corresponding to the corresponding keyword in the knowledge graph, to generate all interest tags corresponding to all the keywords. In some embodiments of the disclosure, the process of generating all interest tags corresponding to all the keyword is described by taking the generating process of the plurality of keywords by extracting the information from the input information of the user as an example.

In some embodiments, when the plurality of keywords are generated by extracting the information from the input information of the user, for each keyword, a regular matching rule can be used to match the keyword with a tag corresponding to each node of the knowledge graph, to determine the first node that matches the keyword in the knowledge graph.

The first node that matches the keyword in the knowledge graph can be a node with a corresponding tag that completely matches the keyword or a node whose matching degree between the corresponding tag and the keyword is greater than a preset matching degree threshold, which is not limited in the disclosure. The preset matching degree threshold can be arbitrarily set, for example, 90% and 80%, which is not limited in the disclosure.

For example, assuming that the keyword is "inspiring cartoon", a tag corresponding to each node of the knowledge graph include "anime", "inspiring anime" or "cartoon". The node corresponding to tag "anime" is node C, the node corresponding to tag "inspiring anime" is node B, and the node corresponding to tag "cartoon" is node D. Node B in the knowledge graph where the tag that exactly matches keyword "inspiring anime" is located is determined as the first node that matches keyword "inspiring anime" in the knowledge graph.

In 203, a root node corresponding to the first node, in the knowledge graph, is obtained.

It can be understood that, in some embodiments of the disclosure, a final parent node of each node in the knowledge graph is referred to as the root node corresponding to the node.

For example, it is supposed that the tag corresponding to node A in the knowledge graph is "BB", the parent node of node A is node B, the tag corresponding to node B is "inspiring anime", the parent node of node B is node C, the tag corresponding to node C is "anime", and node C does not have a parent node, that is, node C is the final parent node of node A, then node C is called the root node corresponding to node A.

In some embodiments, after determining the first node that matches the keyword in the knowledge graph, the root node corresponding to the first node in the knowledge graph can be obtained. For example, after it is determined that the first node that matches keyword "BB" in the knowledge graph is node A, node C can be determined as the root node corresponding to node A.

In 204, a tag corresponding to the first node, a tag corresponding to the root node, and tags corresponding to nodes in a path from the first node to the root node, are determined as interest tags corresponding to the keyword.

For example, based on the above example, after determining that the first node matching the keyword is node A, and the root node corresponding to the first node is node C, tag "BB" corresponding to node A, tag "anime" corresponding to node C and tag "inspiring anime" corresponding to node B in the path between node A and node C are determined as the interest tags corresponding to keyword "BB".

It can be known from the above process that, in some embodiments of the disclosure, for each keyword, in the path from the first node matching the keyword in the knowledge graph to the root node corresponding to the first node, the tag (including the tag corresponding to the first node and the tag corresponding to the root node corresponding to the first node) corresponding to each node is determined as the interest tag corresponding to the keyword, so that all the interest tags corresponding to the keyword extracted from the user input information can be determined. By obtaining the interest tags corresponding to each keyword in this way, the finally obtained interest tags corresponding to each keyword is not only a tag that completely matches the keyword or a tag whose matching degree exceeds the preset matching degree threshold, but also include a parent tag of the interest tags that match this keyword. Therefore, the generated interest tags corresponding to each keyword are more abundant, and the user interest profile generated based on the interest tags corresponding to each keyword is more accurate.

In 205, the interest tags corresponding to the at least one keyword are sorted, and a user interest profile is generated based on the sorted interest tags corresponding to the at least one keyword.

For the specific implementation process and principle of the above-mentioned 205, reference may be made to the description of the above-mentioned embodiments, which will not be repeated herein.

According to the method for generating the user interest profile of some embodiments of the disclosure, the information is extracted from the input information of the user to generate the at least one keyword. Each keyword in the at least one keyword is matched with the tags corresponding to the nodes of the knowledge graph to determine the first node that matches the corresponding keyword in the knowledge graph. The root node corresponding to the first node in the knowledge graph is obtained. The tag corresponding to the first node, the tag corresponding to the root node, and the tags corresponding to the nodes in the path between the first node and the root node are determined as the interest tags corresponding to the keyword. The interest tags corresponding to the at least one keyword are sorted, and the user interest profile is generated based on the sorted interest tags corresponding to the at least one keyword. Therefore, the labor cost for generating the user interest profile is reduced.

According to the above analysis, in some embodiments of the disclosure, after generating the interest tags corresponding to the at least one keyword, the interest tags corresponding to the at least one keyword can be sorted, and the user interest profile is generated according to the sorted interest tags corresponding to the at least one keyword. The following further describes the process of sorting the interest tags corresponding to the at least one keyword in the method for generating the user interest profile of the disclosure with reference to FIG. 3.

Figure 3:
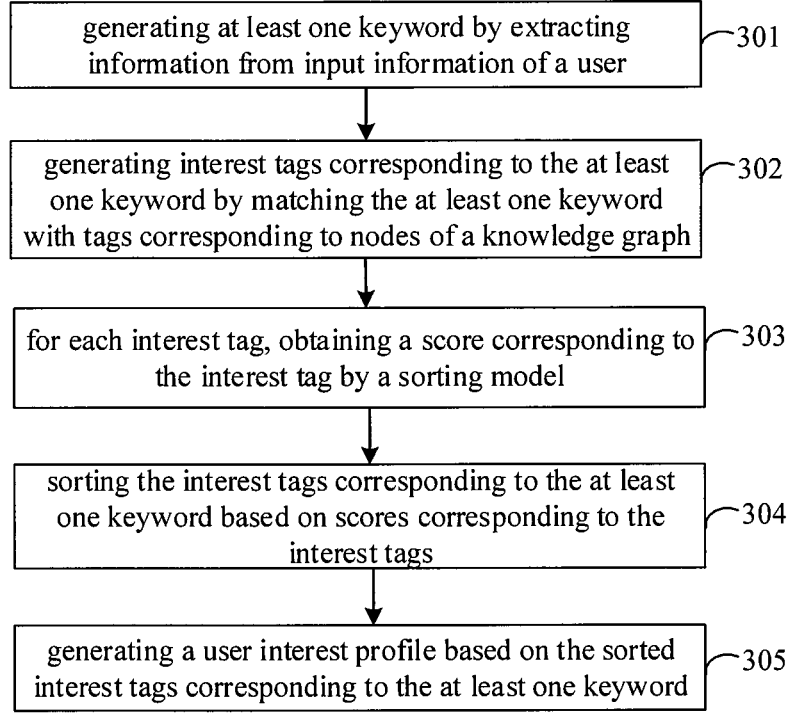
FIG. 3 is a flowchart of a method for generating a user interest profile according to a third embodiment of the disclosure.

FIG. 3 is a flowchart of a method for generating a user interest profile according to a third embodiment of the disclosure. As shown in FIG. 3, the method for generating the user interest profile may include the following.

In 301, at least one keyword is generated by extracting information from input information of a user.

In 302, interest tags are generated corresponding to the at least one keyword by matching the at least one keyword with tags corresponding to nodes of a knowledge graph.

There are a plurality of interest tags corresponding to the at least one keyword.

In 303, for each interest tag, a score corresponding to the interest tag is obtained by a sorting model.

In 304, the interest tags corresponding to the at least one keyword are sorted based on scores corresponding to the interest tags.

In some embodiments, the sorting model is used to score the interest tags to obtain a score for each interest tag. The score for each interest tag represents a probability that the corresponding interest tag is an interest tag corresponding to the user in 301. All the interest tags corresponding to the at least one keyword are sorted based on the scores of all the interest tags corresponding to the at least one keyword in a descending order.

The sorting model may be a logistic regression (LR) model or may be another dichotomy model, which is not limited in some embodiments of the disclosure.

The score corresponding to each interest tag is obtained by the sorting model, and then all the interest tags corresponding to the at least one keyword are sorted based on the scores corresponding to all the interest tags corresponding to the at least one keyword. Therefore, a more accurate sorting result of all the interest tags corresponding to the at least one keyword can be obtained.

In some embodiments, for each interest tag, obtaining the score corresponding to the interest tag by the sorting model, includes: obtaining a weight of the interest tag and a weight of a keyword corresponding to the interest tag; obtaining a second node that matches the keyword corresponding to the interest tag in the knowledge graph and a third node where the interest tag is located; determining a topology length between the second node and the third node in the knowledge graph; and obtaining the score corresponding to the interest tag by inputting the weight of the interest tag, the weight of the keyword corresponding to the interest tag, and the topology length between the second node and the third node into the sorting model.

It can be understood that, in some embodiments of the disclosure, the interest tags are obtained by matching the at least one keyword with the tags corresponding to the nodes in the knowledge graph, and for each interest tag, it may correspond to a keyword or a plurality of keywords.

For example, it is assumed that the information is extracted from the input information of the user, and the generated keywords are "BB" and "inspiring anime". "BB" is an anime name, "BB" is matched with the tags corresponding to the nodes in the knowledge graph, and interest tags "BB", "inspiring anime" and "Anime" corresponding to keyword "BB" are obtained. "Inspiring anime" is matched with the tags corresponding to the nodes in the knowledge graph, and interest tags "inspiring anime" and "Anime" corresponding to keyword "inspiring anime" are obtained. That is, three interest tags "BB", "inspiring anime" and "Anime" corresponding to keywords "BB" and "inspiring anime" are finally generated. In some embodiments of the disclosure, for interest tag "BB", keyword "BB" is the keyword corresponding to interest tag "BB"; for interest tag "inspiring anime", keywords "BB" and "inspiring anime" are keywords corresponding to interest tag "inspiring anime"; and for the interest tag "Anime", keywords "BB" and "inspiring anime" are keywords corresponding to interest tag "Anime".

In some embodiments, for each interest tag, the weight of the interest tag may be obtained based on a number of page views corresponding to the interest tag. For example, the correspondence between the numbers of page views and weighs can be preset, so that for each interest tag, after querying the number of page views corresponding to the interest tag in the knowledge base such as Encyclopedic knowledge base, the weight of the interest tag can be obtained based on the number of page views and the correspondence between the numbers of page views and the weights.

In some embodiments, for each interest tag, a term frequency-inverse document frequency (TF-IDF) algorithm may be used to obtain the weight of the keyword corresponding to the interest tag. For example, the input information of the plurality of users can be obtained in advance, the information can be extracted from the input information of the plurality of users to generate a plurality of keywords, a frequency of each keyword appearing in the input information of all the users can be determined, and a number of times that each keyword in the input information of each user appears in the historical input information of the corresponding user can be obtained. Then, for each keyword extracted from the user input information in 301, the weight of the keyword can be determined based on the number of times that the keyword in the user input information appears in the historical input information of the corresponding user, and the frequency of the keyword appears in the input information of all the users, and the weight of each keyword extracted from the user input information can be further determined. Further, for each interest tag, after the keyword corresponding to the interest tag is determined, the weight of the keyword corresponding to the interest tag may be determined based on the determined weight corresponding to each keyword.

It can be known from the above embodiments that for each interest tag, there may be one or more keyword corresponding to the interest tag. For each interest tag, when there is one keyword corresponding to the interest tag, the node matching the keyword in the knowledge graph can be determined as the second node, the node where the interest tag is located is determined as the third node, and the topology length between the second node and the third node in the knowledge graph can be determined. For each interest tag, when there are a plurality of keywords corresponding to the interest tag, for each keyword corresponding to the corresponding interest tag, the node in the knowledge graph that matches the keyword can be determined as the second node, and the node where the interest tag is located is the third node, and the topology length between the second node and the third node in the knowledge graph can be determined, thus a plurality of topology lengths are determined.

In some embodiments, the sorting model can be pre-trained. The input of the sorting model is the weight of the interest tag, the weight of the keyword corresponding to the interest tag, and the topology length between the node matching the keyword corresponding to the interest tag and the node where the interest tag is located in the knowledge graph, and the output is the score corresponding to the interest tag. For each interest tag, the weight of the interest tag, the weight of the keyword corresponding to the interest tag, and the topology length between the second node matching the keyword corresponding to the interest tag and the third node where the interest tag is located in the knowledge graph are determined, the score corresponding to the interest tag is obtained by inputting the weight of the interest tag, the weight of the keyword corresponding to the interest tag, and the topology length between the second node matching the keyword corresponding to the interest tag and the third node where the interest tag is located into the sorting model.

It should be noted that, for each interest tag, when there are a plurality of keywords corresponding to the interest tag, the weight of the keyword corresponding to the interest tag input into the sorting model is a sum of corresponding weights of the plurality of keywords. The topology length between the second node matching the keyword corresponding to the interest tag and the third node where the interest tag is located in the knowledge graph is a sum of topology lengths between the second node matching each keyword corresponding to the interest tag and the third node where the interest tag is located in the knowledge graph.

For example, it is supposed that the node corresponding to tag "BB" in the knowledge graph is node A, the node corresponding to tag "inspiring anime" is node B, and the node corresponding to tag "Anime" is node C, the parent node of node A is node B, the parent node of node B is node C, and node C has no parent node.

Information is extracted from the input information of the user, and keywords "BB" and "inspiring anime" are generated. "BB" is an anime name, keyword "BB" is matched with the tags corresponding to the nodes in the knowledge graph, and interest tags "BB", "inspiring anime" and "Anime" corresponding to keyword "BB" are obtained. Keyword "inspiring anime" is matched with the tags corresponding to the nodes in the knowledge graph, and interest tags "inspiring anime" and "Anime" corresponding to keyword "inspiring anime" are obtained. That is, three interest tags "BB", "inspiring anime" and "Anime" corresponding to keywords "BB" and "inspiring anime" are finally generated. The keyword corresponding to interest tag "BB" is keyword "BB", keywords corresponding to interest tag "inspiring anime" are keywords "BB" and "inspiring anime", and keywords corresponding to interest tag "Anime" are keywords "BB" and "inspiring anime".

For interest tag "BB", three parameters, i.e., the weight of interest tag "BB", the weight of keyword "BB" corresponding to interest tag "BB", and the topology length (i.e., 0) between node A matching keyword "BB" in the knowledge graph and node A where interest tag "BB" is located, are input into the sorting model, to obtain the score of interest tag "BB".

For interest tag "inspiring anime", the weight of interest tag "inspiring anime", the weight of keyword "BB" corresponding to interest tag "inspiring anime", the weight of keyword "inspiring anime" corresponding to interest tag "inspiring anime", the topology length 1 between node A matching keyword "BB" in the knowledge graph and node B where interest tag "inspiring anime" is located, the topology length 0 between node B that matches keyword "inspiring anime" in the knowledge graph and node B where interest tag "inspiring anime" is located are obtained. The weight of interest tag "inspiring anime", the sum of the weights of keyword "BB" and keyword "inspiring anime", the sum of the topology length 1 and the topology length 0, these three parameters are input into the sorting model to obtain the score corresponding to interest tag "inspiring anime".

For interest tag "Anime", the weight of interest tag "Anime", the weight of keyword "BB" corresponding to interest tag "Anime", the weight of keyword "inspiring anime" corresponding to interest tag "Anime", the topology length 2 between node A matching keyword "BB" in the knowledge graph and node C where interest tag "Anime" is located, and the topology length 1 between node B that matches keyword "inspiring anime" to node C where interest tag "Anime" is located in the knowledge graph are obtained. Then the weight of interest tag "Anime", the sum of the weights of keywords "BB" and "inspiring anime", and the sum of the topology length 2 and the topology length 1, are input into the sorting model to obtain the score for interest tag "Anime".

For each interest tag, the weight of the interest tag is obtained based on the number of page views corresponding to the interest tag, and the TF-IDF algorithm is used to obtain the weight of the keyword corresponding to the interest tag, and the topology length between the second node matching the keyword corresponding to the interest tag in the knowledge graph and the third node where the interest tag is located are obtained. Then, the weight of the interest tag, the weight of the keyword corresponding to the interest tag, and the topology length between the second node and the third node are input into the sorting model, to obtain the score corresponding to the interest tag, and the score corresponding to each interest tag can be accurately determined, and the accuracy of the generated user interest profile is improved.

In some embodiments, before 303, the sorting model can also be obtained by training, that is, before 303, the method further includes: obtaining training data; obtaining an initial sorting model; and obtaining a trained sorting model by training the initial sorting model based on the training data.

In some embodiments, sample input information of a plurality of users can be obtained. Positive sample interest tags belonging to each user can be manually marked. At the same time, some tags that do not belong to the user can be set as negative sample interest tags for each user. The sample input information of the users, the positive sample interest tags and negative sample interest tags of each user in the plurality of users are determined as the training data, and then the training data is used to train the initial sorting model, to obtain the trained sorting model.

The initial sorting model may be an LR model or other dichotomy model, which is not limited in some embodiments of the disclosure.

In some embodiments, when training the initial sorting model based on the training data, for example, training can be performed by means of deep learning. Compared with other machine learning methods, the performance of deep learning on large database is better.

In some embodiments, for the sample input information of each user, information is extracted from the sample input information according to the method described in the preceding embodiments, to generate at least one sample keyword. At least one sample keyword is matched with the tags corresponding to the nodes of the knowledge graph, to generate sample interest tags corresponding to at least one sample keyword. For each sample interest tag, the weight of the sample interest tag, the weight of the sample keyword corresponding to the sample interest tag, and the topology length between the second node that matches the sample keyword corresponding to the sample interest tag in the knowledge graph and the third node where the sample interest tag is located are obtained.

When training the initial sorting model by means of deep learning, a weight of sample interest tag a1 obtained based on sample input information of user a, a weight of sample keyword a1' corresponding to sample interest tag a1, a topology length between the second node matching sample keyword a1' in the knowledge graph and the third node where sample interest tag a1 is located are obtained and input into the initial sorting model, to obtain the score of sample interest tag a1. The score of sample interest tag a1 represents a probability that sample interest tag a1 is an interest tag corresponding to user a. With reference to the score of sample interest tag a1, and whether a1 in the training data is a positive sample interest tag or a negative sample interest tag of user a, model parameters of the initial sorting model is adjusted to obtain the adjusted sorting model. A weight of another sample interest tag a2 obtained based on the sample input information of user a, a weight of sample keyword a2' corresponding to sample interest tag a2, and a topology length between the second node matching sample keyword a2' in the knowledge graph and the third node where sample interest tag a2 is located are obtained and input into the adjusted sorting model, to obtain the score of sample interest tag a2. The score of sample interest tag a2 represents a probability that sample interest tag a2 is an interest tag corresponding to user a. With reference to the score of sample interest tag a2, and whether a2 in the training data is the positive sample interest tag or the negative sample interest tag of user a, the model parameters of the adjusted sorting model are adjusted to obtain the further adjusted sorting model. Thus, on the basis of the weight of the sample interest tag obtained based on the sample input information of each user, the weight of the sample keyword corresponding to the sample interest tag, and the topology length between the second node that matches the sample keyword corresponding to the sample interest tag in the knowledge graph and the third node where the sample interest tag is located, and whether the sample interest tag is the positive sample interest tag or the negative sample interest tag of the corresponding user, the model parameters of the initial sorting model are continuously adjusted to iteratively train the initial sorting model, until the accuracy of the score of the sample interest tag output by the sorting model satisfy a preset threshold, the training is completed and the trained sorting model is obtained.

In 305, a user interest profile is generated based on the sorted interest tags corresponding to the at least one keyword.

It should be noted that, after obtaining the sorted interest tags corresponding to the at least one keyword, the interest tags corresponding to the at least one keyword can also be post-processed as required, for example words in a blacklist may be deleted, and the order of the interest tag is preceded when the interest tag is a hot word.

Figure 4:
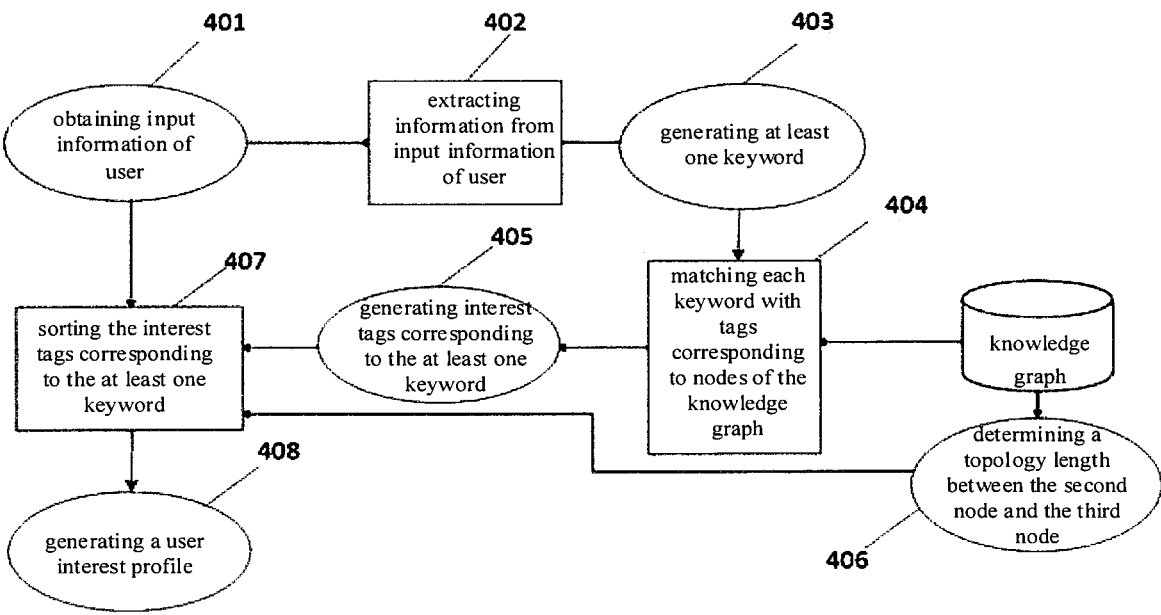
FIG. 4 is another flowchart of a method for generating a user interest profile according to a third embodiment of the disclosure.

In combination with FIG. 4, the method for generating the user interest profile according to some embodiments of the disclosure will be further described.

As shown in FIG. 4, the input information of the user may be obtained first (401). Information is extracted from the input information of the user (402). At least one keyword is generated (403). Further, at least one keyword may be matched with tags corresponding to nodes of the knowledge graph (404), and then interest tags corresponding to the at least one keyword may be generated (405). For each interest tag, the weight of the interest tag (not shown in FIG. 4), the weight of the keyword corresponding to the interest tag (not shown in FIG. 4), and the topology length between the node matching the keyword corresponding to the interest tag and the node where the interest tag is located in the knowledge graph (406) are obtained. Further, for each interest tag, the weight of the interest tag, the weight of the keyword corresponding to the interest tag, and the topology length between the node matching the keyword corresponding to the interest tag in the knowledge graph and the node where the interest tag is located are obtained and input into the forting module, to obtain the score corresponding to the interest tag, so that according to the scores of the interest tags corresponding to the at least one keyword, the interest tags corresponding to the at least one keyword are sorted (407) to generate the user interest profile (408).

Through the above process, after the information is extracted from the input information of the user, the at least one keyword is generated. Interest tags corresponding to the at least one keyword are generated. Based on the topology length between the node matching the keyword corresponding to the interest tag in the knowledge graph and the node where the interest tag is located, the sorting model is used to sort the interest tags corresponding to the at least one keyword, and then the user interest profile is generated based on the sorted interest tags corresponding to the at least one keyword.

The apparatus for generating the user interest profile according to the disclosure will be described below with reference to FIG. 5.

Figure 5:
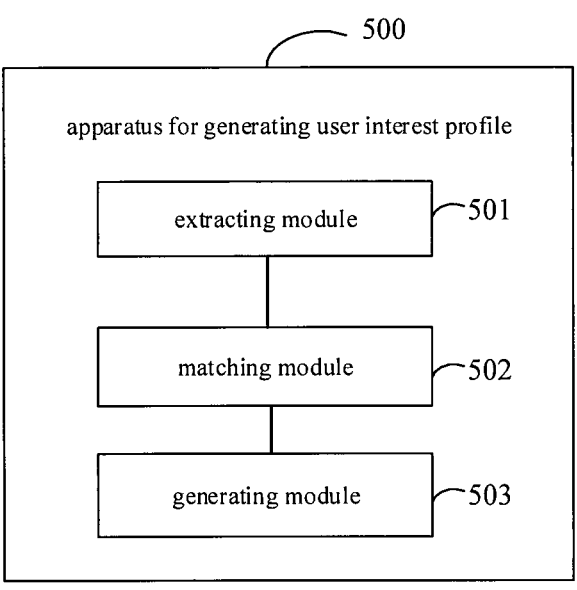
FIG. 5 is a block diagram of an apparatus for generating a user interest profile according to a fourth embodiment of the disclosure.

FIG. 5 is a block diagram of an apparatus for generating a user interest profile according to a fourth embodiment of the disclosure.

As shown in FIG. 5, an apparatus 500 for generating the user interest profile according to the disclosure includes an extracting module 501, a matching module 502 and a generating module 503.

The extracting module 501 is configured to generate at least one keyword by extracting information from input information of a user.

The matching module 502 is configured to generate interest tags corresponding to the at least one keyword by matching the at least one keyword with tags corresponding to nodes of a knowledge graph.

The generating module 903 is configured to sort the interest tags corresponding to the at least one keyword and generate a user interest profile based on the sorted interest tags corresponding to the at least one keyword.

It should be noted that, the apparatus for generating the user interest profile according to some embodiments may execute the method for generating the user interest profile in the foregoing embodiments. The apparatus for generating the user interest profile may be an electronic device or may be configured in the electronic device, so as to reduce the labor cost for generating the user interest profile.

The electronic devices can be any stationary or mobile computing devices capable of data processing, for example, mobile computing devices such as notebook computers, smart phones, and wearable devices, or stationary computing devices such as desktop computers, servers or other types of computing devices, which are not limited in the disclosure.

It should be noted that the foregoing description of some embodiments of the method for generating the user interest profile is also applicable to the apparatus for generating the user interest profile of the disclosure, and details are not repeated herein.

With the apparatus for generating the user interest profile of some embodiments of the disclosure, the information is extracted from the input information of the user to generate the at least one keyword. The at least one keyword is matched with the tags corresponding to the nodes of the knowledge graph to generate the interest tags corresponding to the at least one keyword. The interest tags corresponding to the at least one keyword are sorted, and the user interest profile is generated based on the sorted interest tags corresponding to the at least one keyword. Therefore, the labor cost for generating the user interest profile is reduced.

The apparatus for generating the user interest profile of the disclosure will be described below with reference to FIG. 6.

Figure 6:
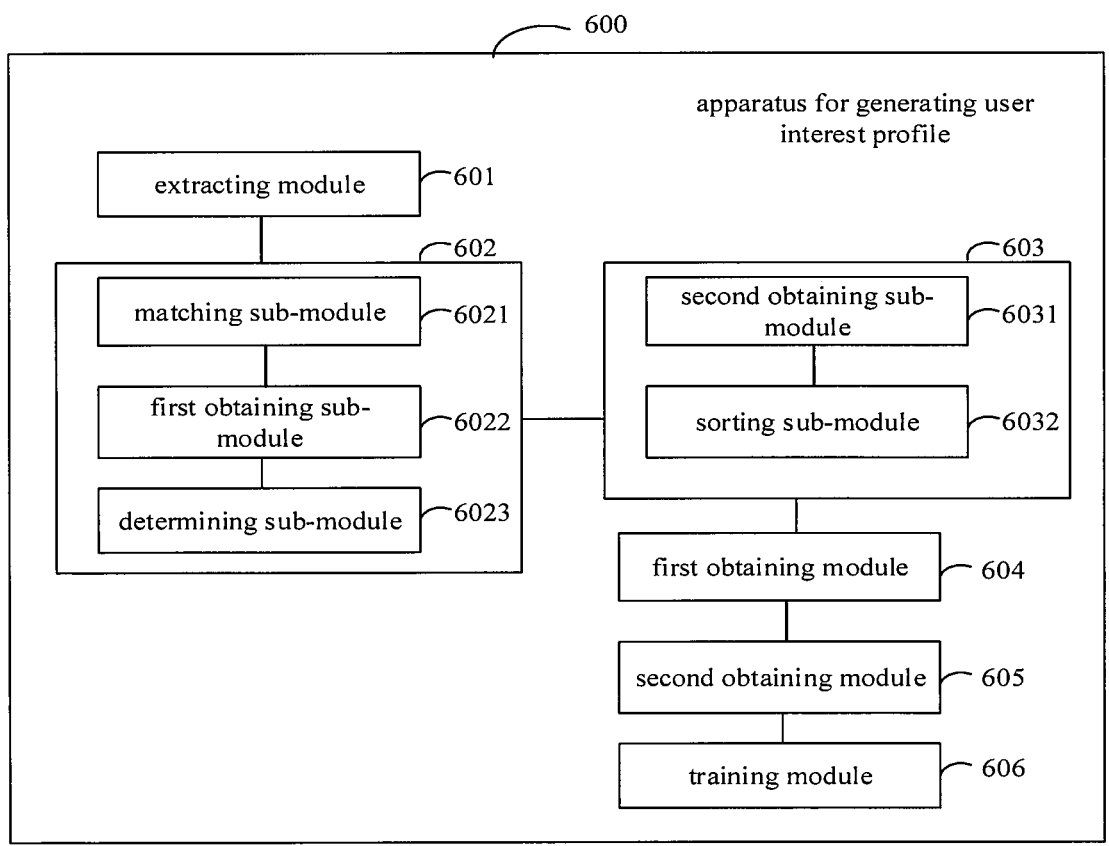
FIG. 6 is a block diagram of an apparatus for generating a user interest profile according to a fifth embodiment of the disclosure.

FIG. 6 is a block diagram of an apparatus for generating a user interest profile according to a fifth embodiment of the disclosure.

As shown in FIG. 6, an apparatus 600 for generating a user interest profile may include an extracting module 601, a matching module 602 and a generating module 603. The extracting module 601, the matching module 602 and the generating module 603 in FIG. 6 have the same functions and structures as the extracting module 501, the matching module 502 and the generating module 503 in FIG. 5.

In some embodiments, the matching module 602 includes a matching sub-module 6021, a first obtaining sub-module 6022 and a determining sub-module 6023.

The matching sub-module 6021 is configured, for each keyword, determine a first node that matches the keyword in the knowledge graph by matching the keyword with the tags corresponding to the nodes of the knowledge graph.

The first obtaining sub-module 6022 is configured to obtain a root node corresponding to the first node, in the knowledge graph.

The determining sub-module 6023 is configured to determine a tag corresponding to the first node, a tag corresponding to the root node, and tags corresponding to nodes in a path from the first node to the root node, as interest tags corresponding to the keyword.

In some embodiments, there are a plurality of interest tags, and the generating module 603 includes a second obtaining sub-module 6031 and a sorting sub-module 6032.

The second obtaining sub-module 6031 is configured to, for each interest tag, obtain a score corresponding to the interest tag by a sorting model.

The sorting sub-module 6032 is configured to sort the interest tags corresponding to the at least one keyword based on the scores corresponding to the interest tags.

In some embodiments, the second obtaining sub-module 6031 includes a first obtaining unit, a second obtaining unit, a determining unit and a third obtaining unit.

The first obtaining unit is configured to obtain a weight of the interest tag and a weight of a keyword corresponding to the interest tag.

The second obtaining unit is configured to obtain a second node that matches the keyword corresponding to the interest tag in the knowledge graph and a third node where the interest tag is located.

The determining unit is configured to determine a topology length between the second node and the third node in the knowledge graph.

The third obtaining unit is configured to obtain the score corresponding to the interest tag by inputting the weight of the interest tag, the weight of the keyword corresponding to the interest tag, and the topology length between the second node and the third node into the sorting model.

In some embodiments, the first obtaining unit includes a first obtaining sub-unit and a second obtaining sub-unit.

The first obtaining sub-unit is configured to obtain the weight of the interest tag based on a number of page views corresponding to the interest tag.

The second obtaining sub-unit is configured to obtain the weight of the keyword corresponding to the interest tag based on a term frequency-inverse document frequency (TF-IDF) algorithm.

In some embodiments, the apparatus 600 for generating the user interest profile further includes a first obtaining module 604, a second obtaining module 605 and a training module 606.

The first obtaining module 604 is configured to obtain training data.

The second obtaining module 605 is configured to obtain an initial sorting model.

The training module 606 is configured to obtain a trained sorting model by training the initial sorting model based on the training data.

It should be noted that the foregoing description of some embodiments of the method for generating the user interest profile is also applicable to the apparatus for generating the user interest profile of the disclosure, and details are not repeated herein.

With the apparatus for generating the user interest profile of some embodiments of the disclosure, the information is extracted from the input information of the user to generate the at least one keyword. The at least one keyword is matched with the tags corresponding to the nodes of the knowledge graph to generate the interest tags corresponding to the at least one keyword. The interest tags corresponding to the at least one keyword are sorted, and the user interest profile is generated based on the sorted interest tags corresponding to the at least one keyword. Therefore, the labor cost for generating the user interest profile is reduced.

According to some embodiments, the disclosure also provides an electronic device, a readable storage medium and a computer program product.

Figure 7:
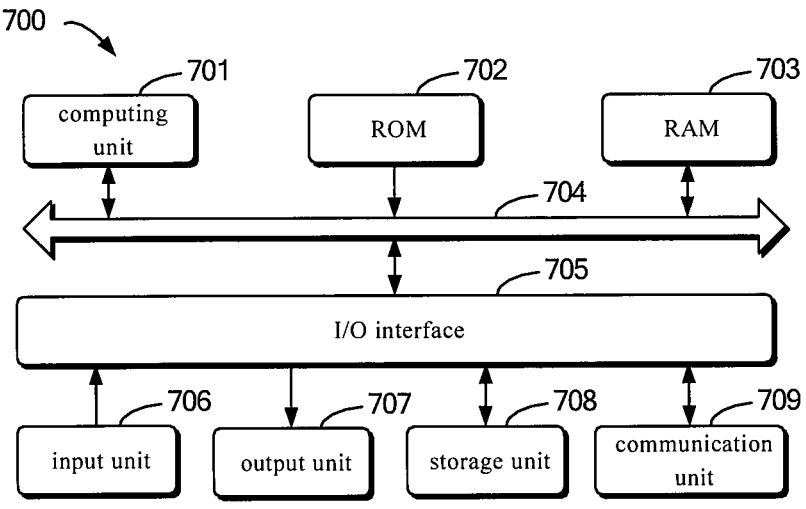
FIG. 7 is a block diagram of an electronic device for implementing a method for generating a user interest profile according to some embodiments of the disclosure.

FIG. 7 is a block diagram of an electronic device for implementing a method for generating a user interest profile according to some embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 7, the device 700 includes a computing unit 701 performing various appropriate actions and processes based on computer programs stored in a read-only memory (ROM) 702 or computer programs loaded from the storage unit 708 to a random access memory (RAM) 703. In the RAM 703, various programs and data required for the operation of the device 700 are stored. The computing unit 701, the ROM 702, and the RAM 703 are connected to each other through a bus 704. An input/output (I/O) interface 705 is also connected to the bus 704.

Components in the device 700 are connected to the I/O interface 705, including: an inputting unit 706, such as a keyboard, a mouse; an outputting unit 707, such as various types of displays, speakers; a storage unit 708, such as a disk, an optical disk; and a communication unit 709, such as network cards, modems, and wireless communication transceivers. The communication unit 709 allows the device 700 to exchange information/data with other devices through a computer network such as the Internet and/or various telecommunication networks.

The computing unit 701 may be various general-purpose and/or dedicated processing components with processing and computing capabilities. Some examples of computing unit 701 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 701 executes the various methods and processes described above, such as the method for generating a user interest profile. For example, in some embodiments, the method may be implemented as a computer software program, which is tangibly contained in a machine-readable medium, such as the storage unit 708. In some embodiments, part or all of the computer program may be loaded and/or installed on the device 700 via the ROM 702 and/or the communication unit 709. When the computer program is loaded on the RAM 703 and executed by the computing unit 701, one or more steps of the method described above may be executed. Alternatively, in other embodiments, the computing unit 701 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), the Internet and Block-chain network.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system to solve the problem that there are the defects of difficult management and weak business expansion in the traditional physical hosts and (Virtual Private Server) VPS services. The server may be a server of a distributed system, or a server combined with a block-chain.

The disclosure relates to the field of computer technologies, in particular to the field of artificial intelligence technologies such as natural language processing and knowledge graph.

It should be noted that artificial intelligence is the study of making computers to simulate certain thinking processes and intelligent behaviors of humans (such as learning, reasoning, thinking and planning), both hardware-level technologies and software-level technologies. Artificial intelligence hardware technologies generally include technologies such as sensors, dedicated artificial intelligence chips, cloud computing, distributed storage, and big data processing. Artificial intelligence software technologies mainly include computer vision, speech recognition technology, natural language processing technology, machine learning/deep learning, big data processing technology, knowledge graph technology and other major directions.

According to the technical solution of some embodiments of the disclosure, the information is extracted from the input information of the user to generate the at least one keyword. The at least one keyword is matched with the tags corresponding to the nodes of the knowledge graph to generate the interest tags corresponding to the at least one keyword. The interest tags corresponding to the at least one keyword are sorted, and the user interest profile is generated based on the sorted interest tags corresponding to the at least one keyword. Therefore, the labor cost for generating the user interest profile is reduced.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A method for generating a user interest profile, applied for page presentation, performed by an electronic device, comprising:

obtaining input information of a user through a human-computer interaction interface of the electronic device;

generating, by a generating device, at least one keyword by extracting information from the input information of the user;

generating interest tags corresponding to the at least one keyword by matching the at least one keyword with tags corresponding to nodes of a knowledge graph;

sorting the interest tags corresponding to the at least one keyword, comprising:

for each interest tag, obtaining a score corresponding to the interest tag by a sorting model; and sorting the interest tags corresponding to the at least one keyword based on scores corresponding to the interest tags;

generating a user interest profile based on the sorted interest tags corresponding to the at least one keyword; and applying the user interest profile for content recommendation in an Internet field;

wherein, generating the interest tags corresponding to the at least one keyword by matching the at least one keyword with the tags corresponding to the nodes of the knowledge graph, comprises:

for each keyword, determining a first node that matches the keyword in the knowledge graph by matching the keyword with the tags corresponding to the nodes of the knowledge graph;

obtaining a root node corresponding to the first node in the knowledge graph; and determining a tag corresponding to the first node, a tag corresponding to the root node, and tags corresponding to nodes in a path from the first node to the root node, as interest tags corresponding to the keyword;

wherein obtaining the score corresponding to the interest tag by the sorting model, comprises:

obtaining a weight of a first interest tag and a weight of a first keyword corresponding to the first interest tag, wherein the interest tag comprises the first interest tag and the second interest tag, and the keyword comprises the first keyword and a second keyword;

taking the first interest tag as a second keyword, and obtaining a second node that matches the second keyword and a third node where the second interest tag corresponding to the second keyword is located;

determining a topology length between the second node and the third node in the knowledge graph; and obtaining the score corresponding to the second interest tag by inputting the weights of the first interest tag and the second interest tag, the weight of the first keyword corresponding to the first interest tag, and the topology length between the second node and the third node into the sorting model;

wherein the method further comprises:

obtaining training data;

obtaining an initial sorting model; and obtaining the sorting model by training the initial ranking model based on the training data;

wherein obtaining the weight of the interest tag comprises:

obtaining the weight of the interest tag based on a number of page views corresponding to the interest tag;

wherein obtaining the weight of the interest tag based on a number of page views corresponding to the interest tag comprises:

obtaining preset correspondence between the numbers of page views and weighs;

querying the number of page views corresponding to the interest tag in a knowledge base; and obtaining the weight of the interest tag based on the number of page views and the preset correspondence between the numbers of page views and the weights.

2. The method of claim 1, wherein, when there are keywords corresponding to the interest tag, the weight of the keyword corresponding to the interest tag comprises a sum of weights of the keywords corresponding to the interest tag; and the topology length comprises a sum of topology lengths between second nodes and the third node.

3. An electronic device, applied for page presentation, comprising:

at least one processor; and a memory communicatively connected to the at least one processor; wherein, the memory is configured to store instructions executable by the at least one processor, and when the instructions are executed by the at least one processor, the at least one processor is caused to execute:

obtaining input information of a user through a human-computer interaction interface of the electronic device;

generating, by a generating device, at least one keyword by extracting information from the input information of the user;

generating interest tags corresponding to the at least one keyword by matching the at least one keyword with tags corresponding to nodes of a knowledge graph;

sorting the interest tags corresponding to the at least one keyword, comprising:

for each interest tag, obtaining a score corresponding to the interest tag by a sorting model; and sorting the interest tags corresponding to the at least one keyword based on scores corresponding to the interest tags;

generating a user interest profile based on the sorted interest tags corresponding to the at least one keyword; and applying the user interest profile for content recommendation in an Internet field;

wherein when the instructions are executed by the at least one processor, the at least one processor is caused to execute:

for each keyword, determining a first node that matches the keyword in the knowledge graph by matching the keyword with the tags corresponding to the nodes of the knowledge graph;

obtaining a root node corresponding to the first node in the knowledge graph; and determining a tag corresponding to the first node, a tag corresponding to the root node, and tags corresponding to nodes in a path from the first node to the root node, as interest tags corresponding to the keyword;

wherein obtaining the score corresponding to the interest tag by the sorting model, comprises:

obtaining a weight of a first interest tag and a weight of a first keyword corresponding to the interest tag, wherein the interest tag comprises the first interest tag and the second interest tag, and the keyword comprises the first keyword and a second keyword;

taking the first interest tag as a second keyword, and obtaining a second node that matches the second keyword and a third node where the second interest tag corresponding to the second keyword is located;

determining a topology length between the second node and the third node in the knowledge graph; and obtaining the score corresponding to the second interest tag by inputting the weights of the first interest tag and the second interest tag, the weight of the first keyword corresponding to the first interest tag, and the topology length between the second node and the third node into the sorting model;

wherein the processor is further caused to execute:

obtaining training data;

obtaining an initial sorting model; and obtaining the sorting model by training the initial ranking model based on the training data;

wherein obtaining the weight of the interest tag comprises:

obtaining the weight of the interest tag based on a number of page views corresponding to the interest tag;

wherein obtaining the weight of the interest tag based on a number of page views corresponding to the interest tag comprises:

obtaining preset correspondence between the numbers of page views and weighs;

querying the number of page views corresponding to the interest tag in a knowledge base; and obtaining the weight of the interest tag based on the number of page views and the preset correspondence between the numbers of page views and the weights.

4. The electronic device of claim 3, wherein when the instructions are executed by the at least one processor, the at least one processor is caused to execute:

obtaining the weight of the interest tag based on a number of page views corresponding to the interest tag.

5. The electronic device of claim 3, wherein, when there are keywords corresponding to the interest tag, the weight of the keyword corresponding to the interest tag comprises a sum of weights of the keywords corresponding to the interest tag; and the topology length comprises a sum of topology lengths between second nodes and the third node.

6. A non-transitory computer-readable storage medium storing computer instructions, wherein the computer instructions are configured to cause a computer to execute a method for generating a user interest profile, wherein the method is applied for page presentation, the method comprising:

obtaining input information of a user through a human-computer interaction interface of an electronic device;

generating, by a generating device, at least one keyword by extracting information from input information of a user;

generating interest tags corresponding to the at least one keyword by matching the at least one keyword with tags corresponding to nodes of a knowledge graph;

sorting the interest tags corresponding to the at least one keyword, comprising:

for each interest tag, obtaining a score corresponding to the interest tag by a sorting model; and sorting the interest tags corresponding to the at least one keyword based on scores corresponding to the interest tags;

generating a user interest profile based on the sorted interest tags corresponding to the at least one keyword; and applying the user interest profile for content recommendation in an Internet field;

wherein, generating the interest tags corresponding to the at least one keyword by matching the at least one keyword with the tags corresponding to the nodes of the knowledge graph, comprises:

for each keyword, determining a first node that matches the keyword in the knowledge graph by matching the keyword with the tags corresponding to the nodes of the knowledge graph;

obtaining a root node corresponding to the first node in the knowledge graph; and determining a tag corresponding to the first node, a tag corresponding to the root node, and tags corresponding to nodes in a path from the first node to the root node, as interest tags corresponding to the keyword;

wherein obtaining the score corresponding to the interest tag by the sorting model, comprises:

obtaining a weight of a first interest tag and a weight of a first keyword corresponding to the first interest tag, wherein the interest tag comprises the first interest tag and the second interest tag, and the keyword comprises the first keyword and a second keyword;

taking the first interest tag as a second keyword, and obtaining a second node that matches the second keyword and a third node where the second interest tag corresponding to the second keyword is located;

determining a topology length between the second node and the third node in the knowledge graph; and obtaining the score corresponding to the second interest tag by inputting the weights of the first interest tag and the second interest tag, the weight of the first keyword corresponding to the first interest tag, and the topology length between the second node and the third node into the sorting model;

wherein the method further comprises:

obtaining training data;

obtaining an initial sorting model; and obtaining the sorting model by training the initial ranking model based on the training data;

wherein obtaining the weight of the interest tag comprises:

obtaining the weight of the interest tag based on a number of page views corresponding to the interest tag;

wherein obtaining the weight of the interest tag based on a number of page views corresponding to the interest tag comprises:

obtaining preset correspondence between the numbers of page views and weighs;

querying the number of page views corresponding to the interest tag in a knowledge base; and obtaining the weight of the interest tag based on the number of page views and the preset correspondence between the numbers of page views and the weights.

* * * * *